(12) United States Patent  
Hu

(10) Patent No.: US 9,696,586 B2  
(45) Date of Patent: Jul. 4, 2017

(54) BACKLIGHT MODULE AND A DISPLAY DEVICE

(71) Applicant: BOE Technology Group Co., Ltd., Beijing (CN)

(72) Inventor: Nannan Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 6 days.

(21) Appl. No.: 14/412,802

(22) PCT Filed: Jun. 20, 2014

(86) PCT No.: PCT/CN2014/080431  
§ 371 (c)(1),  
(2) Date: Jan. 5, 2015

(87) PCT Pub. No.: WO2015/081689  
PCT Pub. Date: Jun. 11, 2015

(65) Prior Publication Data  
US 2016/0252778 A1 Sep. 1, 2016

(30) Foreign Application Priority Data  
Dec. 2, 2013 (CN) .......................... 2013 1 0632812

(51) Int. Cl.  
*G02F 1/1335* (2006.01)
(52) U.S. Cl.  
CPC .... *G02F 1/133608* (2013.01); *G02F 2201/46* (2013.01); *G02F 2201/54* (2013.01)

(58) Field of Classification Search  
CPC ................................................ G02F 1/133608  
See application file for complete search history.

(56) References Cited

U.S. PATENT DOCUMENTS 6,950,154 B2 * 9/2005 Lee ...................... G02B 6/0088  
349/58  
7,573,540 B2 * 8/2009 Katsuda ............ G02F 1/133308  
349/58

(Continued)

FOREIGN PATENT DOCUMENTS

CN 101030000 A 9/2007  
CN 201170490 Y 12/2008

(Continued)

OTHER PUBLICATIONS

Sep. 24, 2014—English Translation of International Search Report and the Written Opinion Appn PCT/CN2014/080431.

(Continued)

*Primary Examiner* — Julie Bannan  
(74) *Attorney, Agent, or Firm* — Banner & Witcoff, Ltd.

(57) ABSTRACT

A backlight module, comprising: a back panel; a film material disposed above the back panel, the film material comprising a bending portion; and at least one film material fixing structure provided on at least one side of the back panel and fixing the bending portion of the film material to the back panel. The backlight module solves the problem of being unable to position a film material due to narrow frames when fixing the film material in a direction perpendicular to the film material. Embodiments of the present disclosure further provide a display device.

14 Claims, 3 Drawing Sheets

(56) References Cited

U.S. PATENT DOCUMENTS

| | | | | |
|---|---|---|---|---|
| 7,936,416 B2* | 5/2011 | Huang | ................... | H05K 5/02 349/58 |
| 8,415,569 B2* | 4/2013 | Chan | ................ | G02F 1/133308 174/544 |
| 8,752,993 B2* | 6/2014 | Yu | .......................... | G09F 13/18 362/607 |
| 2005/0254261 A1* | 11/2005 | Lo | ....................... | G02B 6/0088 362/633 |
| 2006/0044490 A1* | 3/2006 | Ichioka | ............ | G02F 1/133308 349/58 |
| 2009/0161345 A1* | 6/2009 | Hsu | ................... | G02F 1/133606 362/97.2 |
| 2010/0039584 A1* | 2/2010 | Sasaki | ..................... | G02B 5/02 349/62 |
| 2011/0221994 A1* | 9/2011 | Kamiyama | ....... | G02F 1/133608 349/58 |
| 2012/0268951 A1* | 10/2012 | Li | ..................... | G02F 1/133608 362/353 |
| 2013/0128419 A1* | 5/2013 | Lu | ......................... | G02F 1/1336 361/679.01 |
| 2013/0208504 A1* | 8/2013 | Huang | ............. | G02F 1/133608 362/609 |
| 2014/0009716 A1* | 1/2014 | Tang | ................. | G02F 1/133608 349/58 |
| 2014/0078441 A1* | 3/2014 | Wang | .................... | G02F 1/1336 349/58 |
| 2014/0211124 A1* | 7/2014 | Huang | ................. | G02B 6/0088 349/65 |
| 2014/0301104 A1* | 10/2014 | Lan | ...................... | G02B 6/0088 362/607 |
| 2015/0160406 A1* | 6/2015 | Zhou | ................. | G02F 1/133606 349/65 |
| 2015/0168640 A1* | 6/2015 | Jeong | ................ | G02F 1/133308 349/58 |
| 2015/0168766 A1* | 6/2015 | Kuk | .................. | G02F 1/133308 349/58 |
| 2015/0237182 A1* | 8/2015 | Lee | ..................... | H04M 1/0266 455/566 |
| 2015/0241730 A1* | 8/2015 | Kondoh | ............ | G02F 1/133608 348/794 |
| 2016/0004007 A1* | 1/2016 | Chen | ................. | G02F 1/133308 349/65 |

FOREIGN PATENT DOCUMENTS

| | | | |
|---|---|---|---|
| CN | 102385180 A | | 3/2012 |
| CN | 102508368 A | | 6/2012 |
| CN | 102661558 A | | 9/2012 |
| CN | 102829395 A | | 12/2012 |
| CN | 102901005 A | | 1/2013 |
| CN | 102913821 A | | 2/2013 |
| CN | 103148459 A | * | 3/2013 |
| CN | 103672600 A | | 3/2014 |
| JP | 2012068431 A | | 4/2012 |
| KR | 20080011983 A | | 2/2008 |

OTHER PUBLICATIONS

Sep. 22, 2015—Second Office Action Appn 201310632812.3 with Eng Tran.

Mar. 14, 2016—(CN)—Third Office Action Appn 201310632812.3 with English Tran.

May 5, 2015—(CN)—First Office Action for Appn 201310632812.3 with Eng Tran.

International Search Report and Written Opinion mailed Sep. 24, 2014 (PCT/CN2014/080431); ISA/CN.

* cited by examiner

BACKLIGHT MODULE AND A DISPLAY DEVICE

The application is a U.S. National Phase Entry of International Application PCT/CN2014/080431 filed on Jun. 20, 2014, designating the United States of America and claiming priority to Chinese Patent Application No. 201310632812.3, filed on Dec. 2, 2013. The present application claims priority to and the benefit of the above-identified applications and the above-identified applications are incorporated by reference herein in their entirety.

TECHNICAL FIELD

Embodiments of the present disclosure relates to a backlight module and a display device.

BACKGROUND

With development of a display technique, a liquid crystal display with a narrow frame structure design is getting more and more popular. The liquid crystal display can utilize a light emitting diode (briefed as LED) or a cold cathode fluorescent lamp (briefed as CCFL) as its backlight, mainly in a side-lit type and a direct-lit type. In the side-lit type backlight, a plurality of point light sources are provided in a line adjacent to one another; in a direct-lit type, the plurality of point light sources are provided regularly on a planar plane. In order to prevent an optical film sheet from moving or dropping off etc. during the handling and assembly process of the backlight, a film material fixing structure is needed to fix the optical film sheet.

It is known for the inventor that the film material is positioned in a direction perpendicular to the film material usually by a film material fixing hook, and as a film material fixing structure is added in the direction perpendicular to the film material, a width of the frame is increased. If the frame is too narrow to perform the positioning of the film material in a direction perpendicular to the film material, thus increasing the difficulty of a narrow frame design.

SUMMARY

At least one embodiment of the present disclosure provides a backlight module comprising: a back panel; a film material provided above the back panel, the film material comprising a bending portion; and at least one film material fixing structure provided on at least one side of the back panel, the bending portion of the film material being fixed to the back panel through the film material fixing structure.

According to an embodiment of the present disclosure, the bending portion of the film material is provided with at least one opening through which the film material fixing structure fixes the film material to the back panel.

According to an embodiment of the present disclosure, at least one hollow-out region is provided on at least one side of the back panel the film material fixing structure jointed with the back panel in the hollow-out region, whereby fixing the film material to the back panel.

According to an embodiment of the present disclosure, the film material fixing structure is a screw which is joined to one hollowed-out region of the film material, in which a thread fitted with the screw is provided.

According to an embodiment of the present disclosure, at least one sides of the back panel is provided with at least one protrusions, the film material fixing structure is an elastic fastener, which is provided with a groove fitted with the protrusion, and the protrusion is jointed in the groove.

According to an embodiment of the present disclosure, a thickness of the film material is equal to or less than 0.3 mm, the bending portion of the film material has a intermittent crease line structure formed by a punching process.

According to an embodiment of the present disclosure, a thickness of the film material is greater than 0.3 mm, partial material of the bending portion of the film material is removed.

According to an embodiment of the present disclosure, the backlight module comprises a glue frame disposed between the back panel and the film material.

According to an embodiment of the present disclosure, a plurality of film material fixing structures is provided on at least one side of the back panel, the bending portion of the film material is provided with at least one opening, through which the plurality of the film material fixing structures fixes the film material to the back panel.

At least one embodiment of the present disclosure provides a display device comprising a backlight module and a liquid crystal panel which is fixed to a light outgoing surface of the backlight module, wherein the backlight module is the backlight module having any one of the features mentioned above.

The embodiment of the present disclosure provides a backlight module and a display device comprising: a back panel; a film material disposed above the back panel, the film material comprising a bending portion; and at least one film material fixing structure provided on at least one side of the back panel which fixes the film material to the back panel. The solution saves a space occupied when the film material is fixed on its front side, by fixing the film material on the side of the back panel, obtains a design of a narrow frame of the backlight module and at the same time avoids defects in fixing of the optical film material and defects in optical at the edges of the display device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the invention. Based on the described embodiments herein, those skilled in the art can obtain other embodiment(s), without any inventive work, which should be within the scope of the disclosure.

It should be noted that, the terms "on", "above", "over" and "under", "below", "underlying" are used to describe the disclosure by referring the figures, and should be not construed as a limit.

Figure 1:
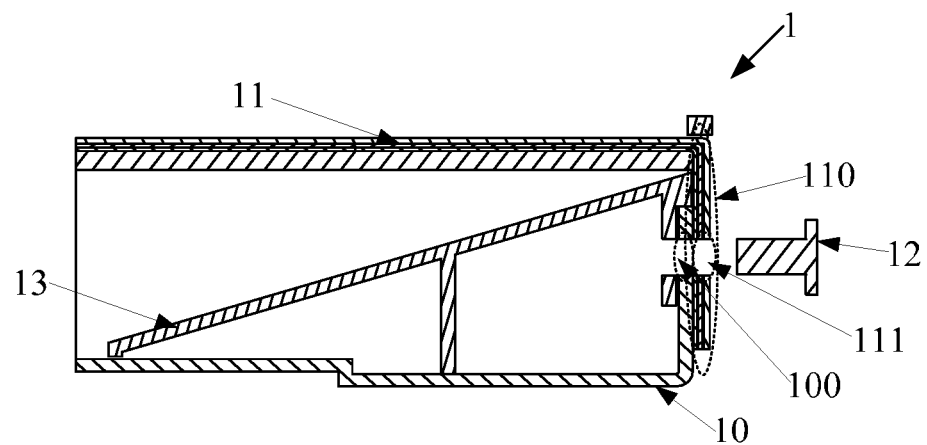
FIG. 1 is a first view schematically illustrating a structure of a backlight module fixing structure according to an embodiment of the present disclosure.

An embodiment of the present disclosure provides a backlight module 1 as illustread in FIG. 1, comprising:

a back panel 10;

a film material 11 provided above the back panel 10, the film material 11 comprising a bending portion 110; and at least one film material fixing structure 12 provided on at least one side of the back panel 10, the bending portion 110 of the film material being fixed to the back panel through the film material fixing structure 12.

In an embodiment, the bending portion 110 of the film material 11 is provided with at least one opening 111, and the film material fixing structure 12 goes through the opening 111 and fixes the film material 11 on the back panel.

Figure 2:
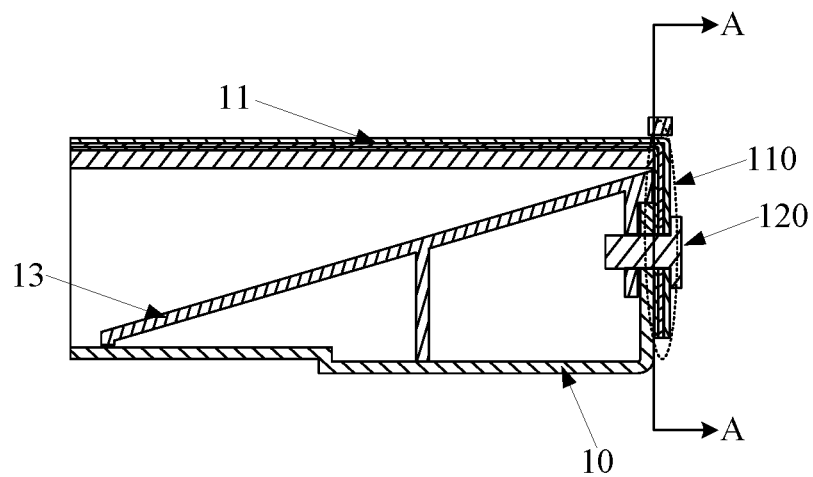
FIG. 2 is a second view schematically illustrating a structure of a backlight module fixing structure according to an embodiment of the present disclosure.
Figure 3:
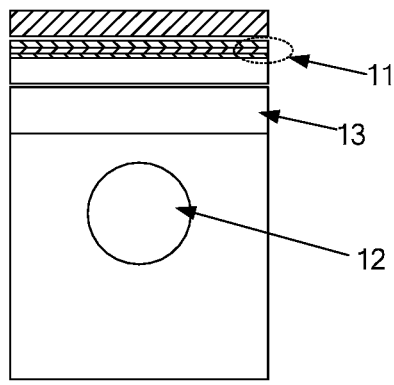
FIG. 3 is a cross sectional view taken along line A-A in FIG. 2 according to an embodiment of the present disclosure.
Figure 4:
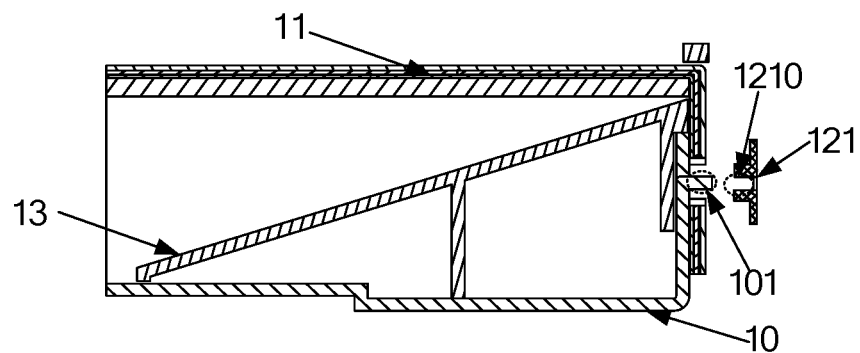
FIG. 4 is a third view schematically illustrating a structure of a backlight module fixing structure according to an embodiment of the present disclosure.
Figure 5:
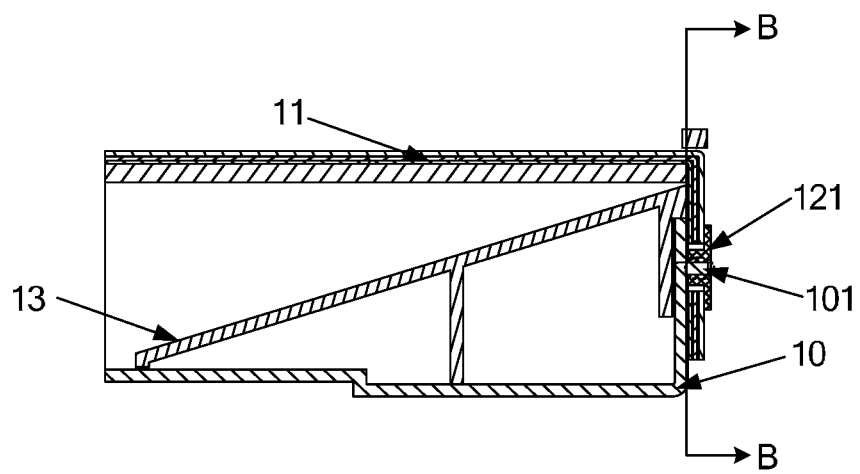
FIG. 5 is a fourth view schematically illustrating a structure of a backlight module fixing structure according to an embodiment of the present disclosure.
Figure 6:
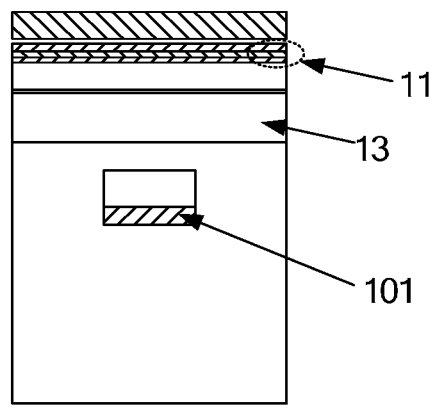
FIG. 6 is a cross sectional view taken along line B-B in FIG. 5 according to an embodiment of the present disclosure.

As illustrated in FIG. 2, the film material fixing structure 12 can be a screw 120, and as illustrate in FIG. 4, the film material fixing structure 12 can also be an elastic fastener.

Furthermore, at least one side of the back panel is provided with at least one hollowed-out region through which the film material is fixed to the back panel by the film material fixing structure.

As illustrated in FIG. 1, at least one side of the back panel 10 is provided with at least one hollowed-out region 100 through which the film material 11 is fixed to the back panel 10 by the film material fixing structure 12; it is also possible to provide a plurality of hollowed-out regions 100 on the at least one side of the back panel 10, and accordingly, the bending portion 110 has a plurality of openings through which and through the hollowed-out region the film material 11 is fixed to the back panel 10 by the plurality of film material fixing structure 12. And it is possible to provide, respectively, a plurality of hollowed-out regions on the plurality sides of the back panel, on each side of which the film material 11 is fixed on the back panel 10 at the side through the opening and the hollowed-out region 100 by the film material fixing structure 12.

According to an embodiment of the present disclosure, the film material fixing structure is a screw which is located in a hollowed-out region of the film material, in which a thread fitted with the screw is provided.

As illustrated in FIG. 2, the film material fixing structure is a screw 120 which is located in a hollowed-out region of the film material, and in which a thread fitted with the screw is provided. It should be noted that, the film material fixing structure of the present embodiment is not limited to a screw, and a nut, a threaded screw or a threaded fastener having a same function as a screw all fall in the protection scope of the present disclosure.

In an embodiment of the present disclosure, at least one side of the back panel is provided with at least one protrusion, the film material fixing structure is an elastic fastener, one side of which is provided with a groove fitted with the protrusion in which the protrusion is fastened.

As illustrated in FIG. 4, at least one side of the back panel 10 is provided with at least one protrusion 101 which is fastened to the film material fixing structure; it is also possible to provide a plurality of protrusions on at least one side of the back panel 10, and it is possible to provide a plurality of protrusions on a plurality of sides of the back panel 10. The film material fixing structure is an elastic fastener 121, one side of which is provided with a groove 1210 fitted with the protrusion 101, and one protrusion 101 on at least one side edge of the back panel 10 is fastened in the groove 1210.

If the thickness of the film material is equal to or less than 0.3 mm, the bending portion of the film material has a intermittent crease line structure formed by a punching process.

If the thickness of the film material is greater than 0.3 mm, partial material of the bending portion of the film material is removed.

Figure 7:
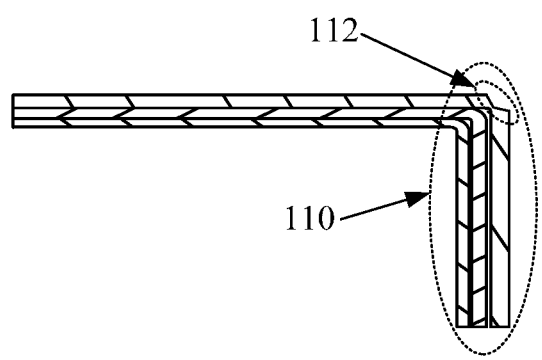
FIG. 7 is a view schematically illustrating a structure of a removed portion of the film material according to an embodiment of the present disclosure.

If the thickness of the film material is greater than 0.3 mm, partial material of the bending portion 110 of the film material, as illustrated in FIG. 7, the removed portion 112 of the bending portion 110 of the film material, can be removed. By removing partial material of the bending portion of the film material, internal tension of the film material can be eliminated, and in turn curls that will be caused by the bending of the film material are eliminated.

It should be noted that, the film material can be one sheet, and can be a plurality of sheets. Bending of the film material can be bending together of all sheets of the film material, or can be bending selected sheets of the film material. However, if several sheets of the film material are bended together, the topmost sheet of the film material must be bended. If the topmost layer of the film material is fixed to place, the topmost layer of the film material applies a constraining force to the underlying film material which is fixed by the topmost layer of the film material.

According to an embodiment of the present disclosure, the backlight module comprises: a glue frame disposed between the back panel and the film material.

As illustrated in FIG. 1, the backlight module further comprises a glue frame 13 disposed between the back panel 10 and the film material 11.

In an embodiment according to the present disclosure, at least one side of the back panel is provided with a plurality of film material fixing structures, and the bending portion of the film material is provided with at least one opening in each of which a corresponding one of the plurality of the film material fixing structures is located.

At least one side of the back panel 10 is provided with a plurality of film material fixing structures 12, and the bending portion 110 of the film material is provided with an opening corresponding to the film material fixing structure each of which is located in the opening, that is, the plurality of the film material fixing structures fix the film material on the back panel through the opening in the bending portion of the film material.

Embodiments of the present disclosure provide a backlight module comprising: a back panel; a film material disposed above the back panel, the film material comprising a bending portion; and at least one film material fixing structure provided on at least one side of the back panel and fixing the bending portion of the film material to the back panel. The solution saves a space occupied when the film material is fixed at the front side, by fixing the film material on the side of the back panel, obtains a design of a narrow frame of the module and at the same time avoids defects in fixing of the optical film material and defects in optical at the edges of the display device.

Figure 8:
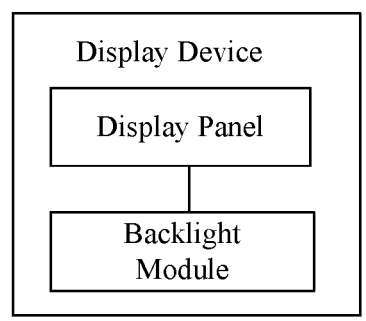
FIG. 8 is a view schematically illustrating a structure of a display device according to an embodiment of the present disclosure.

An embodiment of the present disclosure provides a display device as illustrated in FIG. 8 comprising a liquid crystal panel and a backlight module in which the liquid crystal panel is fixed on a light outgoing surface of the backlight module which is a backlight module having any one of the features mentioned above.

The display device according to the embodiment of the present disclosure can be any product with a display function, such as a liquid crystal device, a liquid crystal television, a digital photo frame, a cell phone, a tablet computer or others that is not limited by the present disclosure.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201310632812.3 filed on Dec. 2, 2013, the disclosure of which is hereby entirely incorporated by reference.

The invention claimed is:

1. A backlight module comprising: a back panel; a film material disposed above the back panel, the film material comprising a bending portion; and at least one film material fixing structure provided on at least one side of the back panel which fixes the bending portion of the film material to the back panel, wherein at least one side of the back panel is provided with at least one hollowed-out region which is joined with the film material fixing structure, the bending portion of the film material is provided with at least one opening which is configured to be passed through by the film material fixing structure, the backlight module further comprises a glue frame disposed between the back panel and the film material, the film material fixing structure passes through the film material, the back panel and the glue frame sequentially so as to fix the film material to the back panel.

2. The backlight module according to claim 1, wherein the film material fixing structure is a screw which is joined to one hollowed-out region of the film material, in which a thread fitted with the screw is provided.

3. The backlight module according to claim 1, wherein a thickness of the film material is equal to or less than 0.3 mm, and the bending portion of the film material has an intermittent crease line structure formed by a punching process.

4. The backlight module according to claim 1, wherein a thickness of the film material is greater than 0.3 mm, and partial material of the bending portion of the film material is removed.

5. The backlight module according to claim 1, wherein at least one side of the back panel is provided with a plurality of film material fixing structures, the bending portion of the film material is provided with at least one opening, and the plurality of the film material fixing structures are located in the at least one opening.

6. A display device comprising a backlight module and a liquid crystal panel which is fixed to a light outgoing surface of the backlight module, characterized in that, the backlight module is the backlight module according to claim 1.

7. The backlight module according to claim 1, wherein, at least one side of the back panel is provided with at least one protrusion, the film material fixing structure is an elastic fastener, one side of which is provided with a groove fitted with the protrusion, and the protrusion is fastened in the groove.

8. The backlight module according to claim 1, wherein a thickness of the film material is equal to or less than 0.3 mm, and the bending portion of the film material has an intermittent crease line structure formed by a punching process.

9. The backlight module according to claim 1, wherein a thickness of the film material is greater than 0.3 mm, and partial material of the bending portion of the film material is removed.

10. The backlight module according to claim 2, wherein a thickness of the film material is equal to or less than 0.3 mm, and the bending portion of the film material has an intermittent crease line structure formed by a punching process.

11. The backlight module according to claim 2, wherein a thickness of the film material is greater than 0.3 mm, and partial material of the bending portion of the film material is removed.

12. A backlight module comprising: a back panel; a film material disposed above the back panel, the film material comprising a bending portion; and at least one film material fixing structure provided on at least one side of the back panel which fixes the bending portion of the film material to the back panel, wherein at least one side of the back panel is provided with at least one protrusion and the bending portion of the film material is provided with at least one opening which is configured to be passed through by the at least one protrusion, the film material fixing structure is an elastic fastener, one side of which is provided with a groove fitted with the protrusion, and the protrusion is fastened in the groove, and the backlight module further comprises a glue frame disposed between the back panel and the film material, the film material fixing structure passes through the at least one opening of the film material so as to be fitted with the protrusion.

13. The backlight module according to claim 12, wherein a thickness of the film material is equal to or less than 0.3 mm, and the bending portion of the film material has an intermittent crease line structure formed by a punching process.

14. The backlight module according to claim 12, wherein a thickness of the film material is greater than 0.3 mm, and partial material of the bending portion of the film material is removed.

* * * * *